June 10, 1958 — A. H. FLETCHER ET AL — 2,838,274
BLADED STATOR STRUCTURES FOR AXIAL-FLOW FLUID MACHINES
Filed May 11, 1953 — 3 Sheets-Sheet 1

INVENTORS
A. H. FLETCHER &
F. H. STARK &
G. ELLISON
BY Wilkinson & Mawhinney
ATTYS.

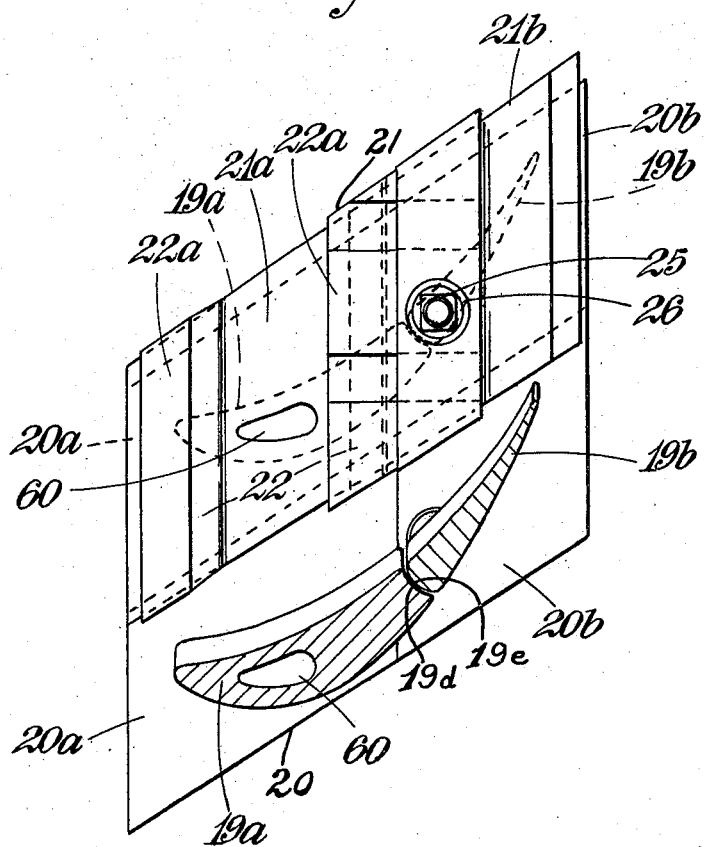

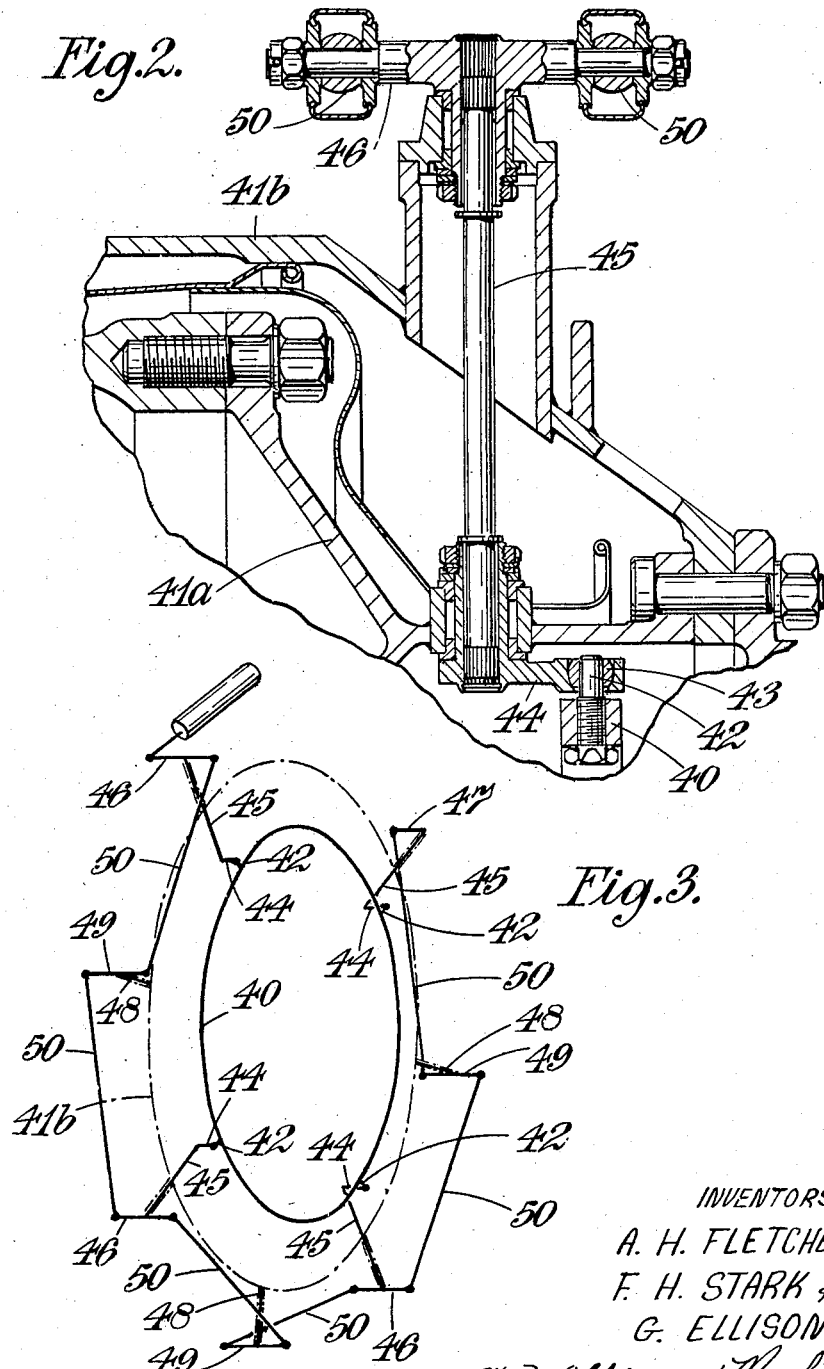

United States Patent Office 2,838,274
Patented June 10, 1958

2,838,274

BLADED STATOR STRUCTURES FOR AXIAL-FLOW FLUID MACHINES

Arthur Holmes Fletcher, Derby, Frank Henry Stark, Chellaston, and George Ellison, Allestree, England, assignors to Rolls-Royce Limited, Derby, England, a British company Application May 11, 1953, Serial No. 354,106

Claims priority, application Great Britain June 4, 1952

6 Claims. (Cl. 253—78)

This invention relates to axial-flow fluid machines, such as axial-flow compressors and axial-flow turbines, and is concerned with bladed stator structures for such machines.

It is sometimes desirable to adjust the swirl-imparting characteristics of the stator blades of an axial-flow fluid machine, and heretofore it has been usual to mount the blades to be angularly adjustable as a whole about their longitudinal axes. Such an adjustable blade arrangement however suffers from the disadvantage that complicated arrangements are required when it is desired to support stationary shrouds or labyrinth seal parts or the like at the inner ends of the blades and adjacent a rotor part of the machine.

This invention has for an object to provide an improved bladed stator structure for an axial-flow fluid machine of the kind (hereinafter referred to as a stator structure of the kind specified), in which the blades have adjustable swirl-imparting characteristics and in which stator parts, such as blade shrouds or labyrinth seal elements, are supported adjacent the rotor part of the machine at the inner ends of the stator blades.

According to the present invention, a stator structure of the kind specified comprises an outer supporting member, a plurality of stator blades, each of which stator blades is divided longitudinally into parts whereof the trailing part (as considered in the direction of flow of working fluid over the blade) is mounted for angular adjustment relative to the leading part of the blade, and the leading parts of the blades are fixed in said supporting member and are adapted or arranged by their inner ends to support other parts of the stator structure adjacent a rotor part of the machine.

The stator structure of this invention has an important use in axial-flow turbines or compressors in which it is desired to give adjustable flow characteristics to stator blades which are in flow series between two rows of rotor blades and at the same time to support between the rotor discs, shroud or labyrinth seal elements. The invention may however be used with advantage for adjustable stator blades at the inlet end or outlet end of an axial-flow compressor or turbine.

According to a preferred arrangement, the trailing parts of the stator blades are angularly adjustable about axes which are radial to the axis of the machine and are located adjacent the junction between the leading and trailing parts of the blades. In this case the trailing edge of the leading part of the blade may be formed as an arcuate-section channel which is a surface of revolution about the axis of adjustment of the trailing part of the blade, and the leading edge of the trailing part of the blade may be correspondingly shaped to fit within the channel. In this way a fixed clearance may be had between the two parts of a blade in all positions of adjustment of the trailing parts with respect to the leading part. Conveniently the trailing part of the blades are pivotally mounted in the outer supporting member and/or in inner stator structure adjacent the rotor part of the machine.

In one preferred embodiment of stator structure of the kind specified, the stator blades are provided with inner and outer shrouds and each shroud is divided into parts corresponding to the leading and trailing parts of the associated blade. The leading part of each shroud is conveniently formed in one piece with the leading part of the associated blade, and the trailing part of each shroud is separate from the trailing part of the associated blade, is formed with a bearing recess to receive a spindle projecting from the trailing blade part, and is clamped to the complementary leading shroud part. When such an embodiment is employed to provide interstage guide vanes between, say, two stages of rotor blading of an axial-flow turbine, the leading parts of the inner shrouds may also have clamped to them the stationary parts of a labyrinth seal structure which is accommodated within the annulus formed by the inner shrouds to co-operate with turbine discs carrying the rotor blades.

The angularly adjustable trailing parts of the blades may be interconnected for simultaneous angular adjustment, for example, by providing each blade with an outwardly-directed spindle to carry a radius arm and by providing coaxially with the ring of blades a coupling ring with which the free ends of the radius arms are engaged so that when the coupling ring is rotated about the axis of the machine each radius arm is caused to swing angularly about the axis of adjustment of the associated trailing blade part.

According to an important feature of this invention, the coupling ring by which the trailing parts of the blades are adjusted simultaneously may be floatingly arranged to encircle the associated stator structure and the coupling ring may in this case be supported coaxially with the machine by means for rotating it about the axis of the machine. For example, the coupling ring may be engaged by the free ends of a number of radius arms, say 4 radius arms, carried at the ends of radial spindles supported rotationally in the outer casing of the machine, the spindles being operatively connected together for simultaneous and equal angular adjustment. The spindles in this case are conveniently equi-angularly disposed around the machine and the connecting means for the spindles may be located externally of the casing so that, say when the stator structure is employed in the turbine of a gas-turbine engine, the connecting means is substantially unaffected by the temperature of the gases flowing through the turbine.

According to another feature of this invention, the connecting means for the spindles may comprise a series of levers, one on the outer end of each of the spindles, the levers being disposed substantially axially of the machine, and a series of links connecting the levers to intermediate idler levers so that when one of the spindle-carried levers is rocked, say by a hydraulic ram, the other spindle-carried levers are rocked in the same direction and to the same extent.

One construction of stator structure of the kind specified will now be described as applied in a multistage turbine of a gas-turbine engine, the construction incorporating the above and other features of this invention. The description makes reference to the accompanying diagrammatic drawings in which:

Figure 1A is a view in the direction of arrow A on Figure 1, parts being omitted to show details of the guide vane construction, Figure 2 is an axial section showing part of an operating mechanism for adjusting the downstream portions of the guide vanes, and Figure 3 is a diagrammatic view of the operating mechanism for adjusting the rotatable parts of the guide vanes shown in Figure 1.

Figure 1:
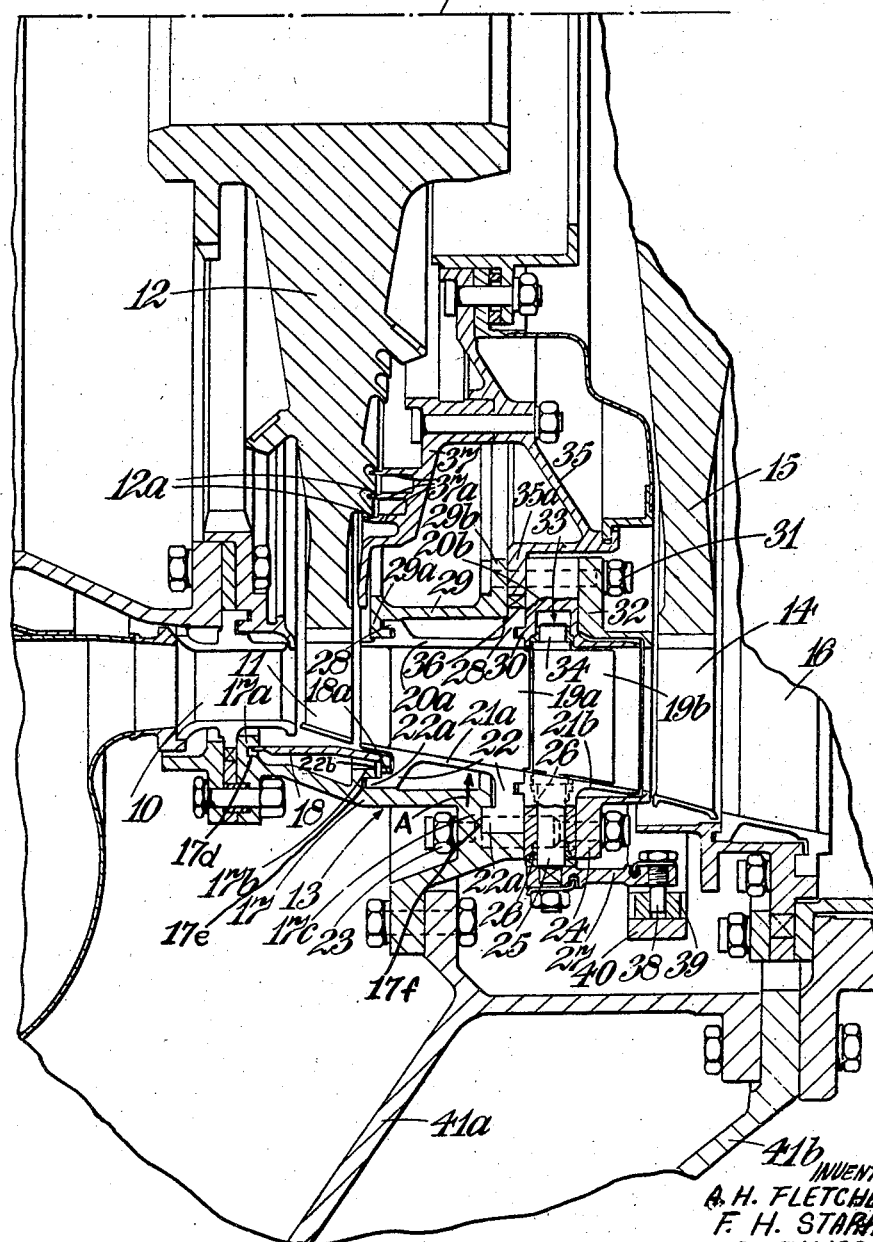
Figure 1 is a part axial section through the multi-stage turbine.

The multi-stage turbine comprises in flow series a ring of inlet nozzle-guide vanes 10 which have fixed flow characteristics, a first-stage ring of rotor blading 11 carried by a first-stage rotor disc 12, an interstage guide vane assembly 13 of which the blades have their flow characteristics adjustable by being constructed in accordance with the invention, a second-stage ring of rotor blading 14 carried on a second turbine rotor disc 15, and a ring of outlet guide vanes 16 afforded by blades of fixed flow-characteristics. Between the two rotor discs 12, 15 of the turbine, and within the interstage guide vane assembly, there is located a labyrinth seal arrangement which is supported from the inner ends of the blades of the interstage nozzle-guide vane assembly.

The structure which comprises the interstage nozzle-guide vane assembly includes a main support ring 17 for the blades of the assembly, which ring has internally three axially-spaced downstream-facing shoulders 17a, 17b, 17c, which are undercut with channels 17d, 17e, 17f, the upstream shoulder 17a having the smallest diameter, the intermediate shoulder 17b having an intermediate diameter, and the downstream shoulder 17c having the largest diameter. The channel 17d in the smallest diameter shoulder 17a is employed to locate both axially and radially one of the axially-spaced edges of a shroud ring 18 for the first-stage rotor blading 11, and the channels 17e, 17f in the other two shoulders 17b, 17c are employed for locating the blades of the interstage guide vane assembly.

Each of the blades of the interstage guide vane assembly is formed in two parts, and each has a non-adjustable leading part 19a and an angularly adjustable trailing part 19b, the axis of adjustment being radial to the turbine axis 11a and extending close to the mating surfaces 19d, 19e on the blade parts 19a, 19b. The mating surfaces 19d, 19e (see Figure 1A) are curved about the axis of adjustment, the surface 19d affording the trailing edge of the leading part 19a being concavely curved and the surface 19e affording the leading edge of the trailing part 19b being convexly curved.

Each blade is provided with individual inner and outer segmental shrouds 20, 21, and each of the shrouds is also formed in two parts, the leading portions 20a, 21a of which are formed in one piece with the leading part 19a of the associated blade, and the trailing parts 20b, 21b of which are formed separate from both the trailing part 19b of the associated blade and the leading parts 20a, 21a of the corresponding shrouds. The segmental shrouds 20, 21, when assembled circumferentially of the turbine, together form complete inner and outer shroud annuli.

The leading portion 21a of each outer shroud segment 21 has formed on its outer surface axially-spaced radial projections 22 having axial flanges 22a to engage in the two channels 19e, 19f in the shoulders 17b, 17c on the main support ring 17 employed for locating the blades, and the axial flanges 22a are retained in position in the channels 19e, 19f in a manner which will be described below. The upstream radial projections 22 on the leading shroud parts 21a are formed with radially inwardly-directed splines 22b and these splines engage with radially outwardly-directed splines 18a on the downstream end of the shroud ring 18 for the first-stage rotor blading, which shroud ring is disposed within the main support ring 17 and extends from the leading edge of the outer blade shrouds to engage by its leading edge in the channel in the smallest diameter shoulder 17a on the main support ring 17.

Each trailing portion 21b of an outer segmental shroud 21 is in the form of a block with one surface suitably shaped to provide the shroud surface. The block is provided with axially-directed bores through which extend retaining bolts 23 by which the trailing shroud portion 21b is clamped to the main support ring 17.

The retaining bolts 23 are located on a pitch circle substantially equal to the maximum diameter of the channel in the largest-diameter shoulder 17c so that the bolts 23 also pass through recesses in the radially outer portions of the downstream projection 22 on the leading shroud parts 21a. A clamping ring 24 is provided to bear against the downstream surfaces of the trailing portions 21b of the segmental shrouds, and the clamping bolts 23 pass through the clamping ring 24. The trailing shroud portions 21b by being clamped against the radial projections 22 on the leading shroud portions 21a, serve to hold the axial flanges 22a on the radial projections 22 on the leading shroud portions 21a in position in the appropriate undercut channels.

The trailing portion 21b of each outer shroud segment is formed with a radial bore therethrough to receive an elongated spindle 25 provided on the angularly adjustable trailing part 19b of the associated blade, and the ends of the bore may be fitted with bearing bushes 26. The radially outer portion of the spindle projects from the bore and carries a radius arm 27, the purpose of which will be described below.

The leading portions 20a of the inner segmental shrouds are each provided with axially-spaced radially-inward projections 28 which are undercut with axially-facing channels. The undercut channels in the upstream radial projections 28 interlock with an undercut flange 29a at the upstream edge of a mounting ring 29 which is located within the annulus formed by the leading portions 20a of the inner segmental shrouds and extends axially to adjacent the downstream edges of these shroud portions.

The trailing portions 20b of the inner shrouds are in the form of blocks having ribs 30 to engage in the undercut channels in the downstream projections 28 on the leading portions 20a of the inner segmental shrouds, and the blocks are formed with axial bores to receive clamping bolts 31 by which the trailing portions 20b of the inner shrouds are clamped to a radially-inwardly-directed flange 29b on the mounting ring 29, and a clamping ring 32 is provided to bear against the downstream surfaces of the blocks 20b. The blocks are also formed with radially-directed recesses 33 in which are fitted bearing bushes to be engaged by stub spindles 34 on the inner ends of the trailing parts 19b of the blades.

An annular diaphragm 35 is located within the inner shroud structure and has at its outer edge a radial flange 35a formed around its periphery with teeth or castellations 36 to engage corresponding teeth or castellations on the inner periphery of the downstream projection 28 from the leading portions 20a of the inner shroud segments and this radial flange 35a is sandwiched between the radially-inwardly-directed flange 29b on the mounting ring 29 and the blocks forming the trailing portions 20b of the segmental shrouds.

The annular diaphragm 35 has at an intermediate radius a thickened annular land, and secured to this land there is a plate 37 formed with a number of radially spaced annular ribs 37a which project axially from the plate to form stationary members of a labyrinth seal whereof the rotating members are formed by annular projections 12a from one surface of the rotor disc 12 supporting the first-stage rotor blading 11. The annular diaphragm 35 may also support other stationary parts of the turbine structure normally provided between two rotor discs.

The leading parts 19a of the blades of the interstage guide-vane assembly may be formed with cooling ducts 60 (Figure 1A) extending therethrough from their inner ends to their outer ends, and the ducts 60 may open at their ends into annular manifolds. The outer manifold may be enclosed by the leading portions 21a of the outer segmental shrouds, by the radial projections 22 on these leading portions and by the main support ring 17. The inner manifold may be enclosed by the leading portions 20a of the inner segmental shrouds, by the axially-spaced radial projections 28 on these parts of the shrouds, and by the mounting ring 29. The cooling air supply to the leading parts 19a of the guide vanes may be effected in any convenient manner.

As has been described the trailing parts 19b of the blades of the inner-stage nozzle-guide-vane assembly are angularly adjustable with respect to the leading parts of the blades, and the trailing parts are supported by the spindles 25, 34 at their outer and inner ends.

The trailing parts 19b of the blades of the inter-stage guide-vane assembly are interconnected for simultaneous and equal angular adjustment. For this purpose the part of each elongated spindle 25 which projects from the radial bore in the corresponding trailing part 21b of an outer shroud, is fitted as above described with a radius arm 27 and the radius arms 27 are arranged to extend substantially axially with respect to the turbine.

Each radius arm 27 carries at its free end a radially projecting pin 38 which engages in a bore formed in a cylindrical metal piece 39 at right angles to its axis, and the metal piece 39 slides in a correspondingly shaped notch in a coupling ring 40. The coupling ring 40 encircles, and is radially spaced from the adjacent parts of the turbine stator structure and is coaxial with the turbine. It will be seen that if the coupling ring 40 is rotated about the turbine axis the radius arms 27 will all be caused to swing simultaneously and equally, thus adjusting the trailing parts 19b of the associated blades simultaneously and equally.

The stator structure also comprises a main outer casing 41a, 41b and the coupling ring 40 is supported from this casing in a manner to maintain it concentric with the turbine, and to prevent relative expansion of the parts of the turbine from affecting the angular adjustment of the trailing edges 19b of the blades.

The coupling ring 40 is provided (see Figures 2 and 3) at each of four equally spaced points around it with a radially projecting peg 42 carrying at its end a bush 43 having a part-spherical external surface, and the bush is received in a recess in the free end of a radius arm 44 carried by the inner end of a radially-outwardly-directed spindle 45 mounted for rotation in the main outer casing 41a, 41b. The four spindles 45 are interconnected externally of the main outer casing 41b in a manner to permit their simultaneous and equal angular adjustment, so that the coupling ring 40, although floating, is positively adjusted at four points through equal angles relative to the turbine axis 11a.

The means connecting the spindles 45 externally of the main outer casing 41b comprises a series of levers and links. All of the coupling-ring adjusting spindles 45, except one, carries at its outer end a first-order lever 46, and the exception carries at its outer end a radius arm 47 (Figure 3) having a lever arm length equal to half the length of one of the first order levers 46. Between each pair of coupling-ring-adjusting spindles 45, except between that carrying the radius arm 47 and one of the adjacent spindles 45, there is provided an idler spindle 48 which carries a first-order lever 49 similar to those carried by the coupling ring adjusting spindles 45.

The levers 46, 49 and the radius arm 47 are secured on their associated spindles 45, 48 to extend substantially axially of the turbine and the ends of the levers 46, 49 and the end of the radius arm 47 are interconnected by the links 50. One arm of the lever 46 carried by the coupling-ring-operating spindle 45 which has no idler spindle 48 between it and the coupling-ring-operating spindle 45 having the radius arm 47, is connected to a hydraulic or pneumatic ram 51 and the other arm of this lever 46 is connected by one of the links 50 to the correspondingly directed arm of the lever 49 on the adjacent idler spindle 48, and the other arm of the latter lever 49 is connected to the corresponding arm of the lever 46 on the next spindle 45 around the casing. In the same way each of the arms of the remaining levers 46, 49 are connected to the correspondingly directed arm of the next adjacent lever 49, 46 in one direction around the casing, and the last of the lever arms 50 is connected to the radius arm 47 on the outer end of the fourth coupling-ring-operating spindle 45.

With this arrangement it will be seen that when the ram 51 operates to adjust one of the levers 46 on the coupling-ring-operating spindles 45, the remaining coupling operating spindles 45 are all equally adjusted in the same direction.

Additionally an important feature of the arrangement is presented by the provision of the idler spindles 48 and the associated first order levers 49; expansion or contraction of the links 50 will be accommodated by angular movement of the idler spindles without any angular movement of the coupling ring adjusting spindles 45 taking place. Thus the angular setting of the latter spindles will be determined by the position of the ram 51 and will be unaffected by uniform expansion or contraction arising for example due to thermal expansion and contraction in the linkage mechanism.

The links 50 may be connected to the levers 46, 49 through universal joints.

We claim:
1. An axial-flow gas turbine comprising stationary outer structure; stationary inner structure co-operating with said stationary outer structure to provide an annular working fluid passage for the turbine; a turbine rotor rotatable with respect to said inner and outer structures about the axis of the working fluid passage; said inner structure including annular gas sealing means co-operating in a gas sealing manner with said turbine rotor; an annular assembly of nozzle guide vanes arranged coaxially with said turbine rotor and extending across the working fluid passage, each nozzle guide vane having a fixed upstream portion with its outer end secured in said outer structure and its inner end secured to said inner structure, said fixed upstream portions providing the sole support for said inner structure, and each nozzle guide vane also having an adjustable downstream portion which is rotatably mounted both in said outer structure and said inner structure for angular adjustment relative to the fixed upstream portion of the vane about an axis substantially radial to the turbine; and means interconnecting said adjustable portions for simultaneous angular adjustment.

2. An axial-flow gas turbine comprising stationary outer structure; axially spaced turbine rotors rotatable within said outer structure; stationary inner structure co-operating with said outer structure to form an annular working fluid passage between said turbine rotors, said inner structure including annular gas sealing means co-operating in a gas sealing manner with at least one of said turbine rotors; an annular assembly of nozzle guide vanes arranged coaxially with said turbine rotors and to extending across the working fluid passage, each nozzle guide vane having a fixed upstream portion secured at its outer end in said outer structure and secured at its inner end in said inner structure said fixed upstream portions providing the sole support for said inner structure, and each nozzle guide vane having an adjustable downstream portion rotatably mounted both in said outer structure and said inner structure for angular adjustment relative to said fixed upstream portion about an axis which is substantially radial to the turbine; and means for interconnecting said adjustable portions of said nozzle guide vanes for simultaneous angular adjustment.

3. An axial flow gas turbine comprising stationary outer structure; stationary inner structure co-operating with said outer structure to provide an annular working fluid passage for the turbine; a turbine rotor rotatable with respect to said inner and outer structures about the axis of the working fluid passage; said inner structure being on the downstream side of the turbine rotor and including annular gas sealing means co-operating in a gas sealing manner with the downstream side of said turbine rotor; an annular assembly of nozzle guide vanes arranged coaxially with said turbine rotor on the downstream side thereof and extending across the working fluid passage, each vane having a fixed upstream portion secured at its outer end in said outer structure secured at its inner end to said inner structure said fixed upstream portions providing the sole support for said inner structure, and each vane having an adjustable downstream portion rotatably mounted both in said outer structure and said inner structure for angular adjustment relative to said upstream portions about axes substantially radial to the turbine; and means interconnecting said adjustable portions for simultaneous angular adjustment.

4. An axial-flow gas turbine comprising stationary outer structure; stationary inner structure co-operating with said outer structure to provide an annular working fluid passage for the turbine; a turbine rotor rotatable with respect to the inner and outer structures about the axis of the passage; said inner structure including annular gas sealing means co-operating in a gas sealing manner with said turbine rotor; an annular assembly of nozzle guide vanes arrranged coaxially with said turbine rotor and extending across the working fluid passage, each nozzle guide vane having a fixed upstream portion, an outer shroud integral with said fixed upstream portion at its outer end and secured in said outer structure, and an inner shroud integral with said fixed upstream portion at its inner end and secured in said inner structure, said fixed upstream portions providing the sole support for said inner structure, and each vane having also an adjustable downstream portion, an outer shroud for said downstream portion mounted in said outer structure, an inner shroud for said downstream portion mounted in said inner structure, a spindle mounted on said downstream portion, bearing means in said inner and outer shrouds of said downstream portion receiving said spindle; and means interconnecting the spindles of all the downstream portions for simultaneous angular adjustment of said downstream portions.

5. An axial-flow gas turbine comprising stationary outer structure; stationary inner structure co-operating with said stationary outer structure to provide an annular working fluid passage for the turbine; a turbine rotor rotatable with respect to said inner and outer structures about the axis of the working fluid passage; said inner structure including annular gas sealing means co-operating in a gas sealing manner with said turbine rotor; an annular assembly of nozzle guide vanes arranged coaxially with said turbine rotor and extending across the working fluid passage, each nozzle guide vane having a fixed upstream portion with its outer end secured in said outer structure and its inner end secured to said inner structure, said fixed upstream portions providing the sole support for said inner structure, and each nozzle guide vane also having an adjustable downstream portion which is rotatably mounted both in said outer structure and said inner structure for angular adjustment relative to the fixed upstream portion of the vane about an axis substantially radial to the turbine; lever means rigidly attached to each of the adjustable downstream portions; an annular coupling member interconnecting said lever means for simultaneous angular movement thereof; additional lever means engaging the coupling member at a plurality of selected points around said coupling member to rotate it; linking means interconnecting said additional lever means for simultaneous angular adjustment thereof; and motor means to actuate said additional lever means.

6. An axial-flow gas turbine comprising stationary outer structure; stationary inner structure co-operating with said stationary outer structure to provide an annular working fluid passage for the turbine; a turbine rotor rotatable with respect to said inner and outer structures about the axis of the working fluid passage; said inner structure including annular gas sealing means co-operating in a gas sealing manner with said turbine rotor; an annular assembly of nozzle guide vanes arranged coaxially with said turbine rotor and extending across the working fluid passage, each nozzle guide vane having a fixed upstream portion with its outer end secured in said outer structure and its inner end secured to said inner structure, said fixed upstream portions providing the sole support for said inner structure, and each nozzle guide vane also having an adjustable downstream portion which is rotatably mounted both in said outer structure and said inner structure for angular adjustment relative to the fixed upstream portion of the vane about an axis substantially radial to the turbine; a plurality of levers, each lever being rigidly mounted on the outer end of an associated one of said adjustable downstream portions; a ring arranged coaxially with said turbine rotor and engaged by said levers, whereby on rotation of the ring the levers are rocked simultaneously and the downstream portions are rotated simultaneously; first radially extending spindles rotatably mounted in said stationary outer structure in a plane transverse to said turbine rotor; second levers at the inner ends of said first spindles co-operating with said annular ring, whereby on rotation of the first spindles the ring is rotated; third levers at the outer ends of said first spindles; radially extending idler spindles rotatably mounted in said stationary outer structure in alternation with said first spindles; first order levers at the outer ends of said idler spindles; first links connecting corresponding ends of the first order levers on the idler spindles to the adjacent third lever in one direction; second links connecting the opposite ends of said first order levers to the adjacent third levers in the opposite direction; and ram means connected to one of said third levers to rock it.

References Cited in the file of this patent

UNITED STATES PATENTS

| | | |
|---|---|---|
| 2,382,913 | Robinson | Aug. 14, 1945 |
| 2,412,365 | Sollinger | Dec. 10, 1946 |
| 2,613,029 | Wilde | Oct. 7, 1952 |
| 2,648,195 | Wilde | Aug. 11, 1953 |
| 2,660,413 | Haworth | Nov. 24, 1953 |

FOREIGN PATENTS

| | | |
|---|---|---|
| 540,707 | Great Britain | Oct. 27, 1941 |
| 872,065 | France | Jan. 29, 1942 |